United States Patent [19]

Hessert et al.

[11] 3,749,172

[45] July 31, 1973

[54] METHODS OF USING GELLED POLYMERS IN THE TREATMENT OF WELLS

[75] Inventors: James E. Hessert; Richard L. Clampitt, Bartlesville, Okla.

[73] Assignee: Phillips Petroleum Company, Bartlesville, Okla.

[22] Filed: Feb. 9, 1972

[21] Appl. No.: 224,915

[52] U.S. Cl.............. 166/274, 166/270, 166/275, 166/295, 175/65
[51] Int. Cl....................... E21b 43/22, E21b 21/04
[58] Field of Search ......................... E21b/33/138; 166/294, 295, 270, 274, 275; 175/65, 72; 252/8.55 D, 8.55 R, 8.5 A, 8.5 C, 316

[56] References Cited
UNITED STATES PATENTS

| | | | |
|---|---|---|---|
| 3,020,953 | 2/1962 | Zerweck et al. | 166/275 X |
| 3,039,529 | 6/1962 | McKennon | 166/275 |
| 3,336,979 | 8/1967 | Ingraham et al. | 166/294 X |
| 3,502,149 | 3/1970 | Pence, Jr. | 166/295 |
| 3,658,129 | 4/1972 | Lanning et al. | 166/294 X |
| 3,687,200 | 8/1972 | Routson | 166/295 |
| 3,699,042 | 10/1972 | Browning | 252/8.5 C |
| 3,701,384 | 10/1972 | Routson et al. | 166/281 |

*Primary Examiner*—Stephen J. Novosad
*Attorney*—Quigg and Oberlin

[57] ABSTRACT

Improvements in secondary recovery operations for the recovery of oil, and improvements in well drilling operations, are accomplished through the use of aqueous mediums comprising aqueous gels prepared from strong brines and certain polyacrylamides and related polymers.

26 Claims, No Drawings

METHODS OF USING GELLED POLYMERS IN THE TREATMENT OF WELLS

This invention relates to methods of preparing and using aqueous gels prepared from polyacrylamides and related polymers.

The secondary recovery of oil from oil-bearing or containing subterranean formations by fluid drive processes wherein a fluid is injected into the formation via one or more injection wells to drive the oil through the formation to one or more production wells is a well known process. Fluids used in such processes include liquids, such as water and various hydrocarbons, and gases such as hydrocarbon gases, carbon dioxide, etc. Many oil reservoirs comprise layers or zones of proous rock which can vary in permeability from more than 1,000 millidarcys to less than 10 millidarcys. In all fluid drive processes a recognized problem is the predilection of the drive fluid to channel along or through the more permeable zones of the formation. This is commonly referred to as fingering. The more conductive zones, after the oil has been largely displaced therefrom, function as "their zones" which permit the drive fluid to channel directly from injection to production wells. In many instances, such channeling or fingering results in leaving substantial quantities of oil in the less permeable zones of the formation which are bypassed. Such channeling or fingering can occur when the mobility, i.e., the quotient of the reservoir's permeability to the drive fluid divided by the viscosity of the drive fluid, becomes large relative to the mobility of the reservoir oil.

Drilling fluids used in the drilling of oil wells, gas wells, and similar boreholes are commonly aqueous liquids containing clays or other colloidal materials. The drilling fluid serves as a lubricant for the bit and drill stem, as a carrying medium for the cuttings produced by the drill bit, and assists in the formation of a filter cake on the wall of the borehole for the reduction of fluid losses to the surrounding subsurface strata. It is known that excessive viscosity in the drilling fluid has an adverse effect on the penetration rate obtained by the drill bit. In many instances, substantially better rates can be secured by eliminating colloidal materials and reducing the viscosity of the drilling fluid. In some instances, air, clear water, or another similar fluid of low viscosity can be used in the place of the ordinary drilling fluid or mud.

It has been discovered that certain aqueous gels can comprise at least a portion of the aqueous medium used in said secondary recovery operations, and the aqueous medium used in said well drilling operations. Said gels are prepared from certain water-dispersible polymers, e.g., polyacrylamides and other related polymers, which when used in combination with a water-soluble compound of a polyvalent metal which can be reduced to a lower polyvalent valence state and a suitable reducing agent capable of reducing said polyvalent metal to said lower polyvalent valence state, can be used as gelling agents to gel aqueous mediums comprising water. By varying the composition and/or amounts of said gelling agents, and/or the conditions under which they are used in forming the gels, a wide range of aqueous gels ranging from liquid highly mobile gels to thick, viscous, somewhat elastic gels can be produced. Said aqueous gels are particularly useful in operations wherein a fluid medium is introduced into a borehole in the earth, e.g., in the above-described secondary operations, in the above-described well drilling operations, in well completion operations, as packer fluids, etc.

In preparing such aqueous gels for use in oil field operations it is desirable for economic and other reasons to use water which is readily available in the field. Frequently, the only readily available water is field brine, produced from wells in the field, and containing large amounts of total dissolved solids. However, it has not been possible to use such brines with the desired assurance of success. In many instances, for reasons not heretofore known, it has been impossible to obtain gels, or when gels are obtained, to obtain gels having the required stability. In order to be assured of success it has been necessary to use fresh water, or at least water containing a relatively small amount of total dissolved solids. In many instances the cost of obtaining such low solids content water can be almost prohibitive.

The present invention provides a solution for the above-described problems. We have now discovered that when using brines containing large amounts of total dissolved solids, the polyacrylamide or related polymer which is used should be one wherein not more than about 14, preferably not more than about 12, percent of the carboxamide gropus have been hydrolyzed to carboxyl groups.

The use of aqueous gels prepared from such polymers is particularly advantageous in near-well treatments of nonfractured porous formations. The characteristics of higher levels of adsorption by the sands of the formation leads to a longer lasting water diversion effect which can be demonstrated by higher residual resistance factors for longer periods of time.

Another advantage in using strong field produced brines in preparing aqueous gels as described herein is that the problem of disposing of such brines is lessened.

Thus, according to the invention, there is provided, in a method wherein a fluid medium is introduced into a borehole in the earth and into contact with a nonfractured porous subterranean formation penetrated by said borehole, the improvement wherein at least a portion of said fluid medium comprises an aqueous gel, and wherein said gel comprises water to which there has been added: a water-thickening amount of a water-dispersible polymer selected from the group consisting of: polyacrylamides and polymethacrylamides wherein from 0.1 to about 14 percent of the carboxamide groups are hydrolyzed to carboxyl groups; crosslinked polyacrylamides and crosslinked polymethacrylamides wherein from 0.1 to about 14 percent of the carboxamide groups are hydrolyzed to carboxyl groups; copolymers of acrylamide with another ethylenically unsaturated monomer copolymerizable therewith, sufficient acrylamide being present in the monomer mixture to impart said water-dispersible properties to the resulting copolymer when it is mixed with water, and wherein from 0.1 to about 14 percent of the carboxamide groups are hydrolyzed to carboxyl groups; and mixtures of said polymers; a sensible amount of a water-soluble compound of a polyvalent metal wherein the metal present is capable of being reduced to a lower polyvalent valence state and which is sufficient to gel said water when the valance of at least a portion of said metal is reduced to said lower valence state; and an amount of a water-soluble reducing agent which is effective to reduce at least a portion of said metal to said lower valence state; and wherein the initial total dissolved solids content of said water is greater than about 60,000 ppm by weight.

Still further according to the invention, there is provided a method for producing an aqueous gel, which method comprises: thickening water by adding thereto at least 0.1 weight percent, based on the weight of said water of a water-dispersible polymer selected from the group consisting of: polyacrylamides and polymethacrylamides wherein from 0.1 to about 14 percent of the carboxamide groups are hydrolyzed to carboxyl groups; crosslinked polyacrylamides and crosslinked polymethacrylamides wherein from 0.1 to about 14 percent of the carboxamide groups are hydrolyzed to carboxyl groups; copolymers of acrylamide with another ethylenically unsaturated monomer copolymerizable therewith, sufficient acrylamide being present in the monomer mixture to impart said water-dispersible properties to the resulting copolymer when it is mixed with water, and wherein from 0.1 to about 14 percent of the carboxamide groups are hydrolyzed to carboxyl groups; and mixtures of said polymers; gelling the so-thickened water by adding thereto an amount of a water-soluble compound of a polyvalent metal wherein the valence state of the metal therein is capable of being reduced to a lower polyvalent valence state and which is sufficient to supply at least about $3 \times 10^{-6}$ gram atoms of said polyvalent metal per gram of said polymer, and an amount of a water-soluble reducing agent which is effective to reduce at least a portion of said metal to said lower valence state; and then diluting the resulting gel with sufficient water to reduce the concentration of said polymer to a final desired concentration; the initial total dissolved solids content of said first-mentioned water being greater than about 60,000 ppm by weight.

Herein and in the claims, unless otherwise specified, the term "polymer" is employed generically to include both homopolymers and copolymers; and the term "water-dispersible polymers" is employed to include those polymers which are truly water-soluble or brine-soluble and those polymers which are dispersible in water or other aqueous medium such as brines to form stable colloidal suspensions which can be gelled as described herein.

Polymers which can be used in the practice of the invention include the various polyacrylamides and related polymers which are partially hydrolyzed, are water-dispersible, and which can be used in an aqueous medium, e.g., a brine, with the gelling agents described herein, to give an aqueous gel. Presently preferred polymers include the various substantially linear homopolymers and copolymers of acrylamide and methacrylamide. By substantially linear it is meant that the polymers are substantially free of crosslinking between the polymer chains. Said polymers will have from 0.1 to about 14, preferably up to about 12, percent of the carboxamide groups hydrolyzed to carboxyl groups. As used herein and in the claims, unless otherwise specified, the term "hydrolyzed" includes modified polymers wherein the carboxyl groups are in the acid form and also such polymers wherein the carboxyl groups are in the salt form, provided said salts are water-dispersible. Such salts include the ammonium salts, the alkali metal salts, and others which are water-dispersible. Hydrolysis can be carried out in any suitable fashion, for example, by heating an aqueous solution of the polymer with a suitable amount of sodium hydroxide.

Substantially linear polyacrylamides can be prepared by methods known in the art. For example, the polymerization can be carried out in aqueous medium, in the presence of a small but effective amount of a water-soluble oxygen-containing catalyst, e.g., a thiosulfate or bisulfate of potassium or sodium or an organic hydroperoxide, at a temperature between about 30° and 80° C. The resulting polymer is recovered from the aqueous medium, as by drum drying, and can be subsequently ground to the desired particle size. A presently preferred particle size is such that about 90 weight percent will pass through a number 10 mesh sieve, and not more than about 10 weight percent will be retained on a 200 mesh sieve (U. S. Bureau of Standards Sieve Series).

Included among the copolymers which can be used in the practice of the invention are the water-dispersible copolymers resulting from the polymerization of a major proportion of acrylamide or methacrylamide and a minor proportion of an ethylenically unsaturated monomer copolymerizable therewith. It is desirable that sufficient acrylamide or methacrylamide be present in the monomers mixture to impart to the copolymer the above-described water-dispersible properties, for example, from about 90 to 99 percent acrylamide and from about 1 to 10 percent other ethylenically unsaturated monomers. Such other monomers include acrylic acid, methacrylic acid, vinylsulfonic acid, vinylbenzylsulfonic acid, vinylbenzenesulfonic acid, vinyl acetate, acrylonitrile, methyl acrylonitrile, vinyl alkyl ether, vinyl chloride, maleic anhydride, and the like. Various methods are known in the art for preparing said copolymers. For example, see U. S. Pat. Nos. 2,625,529; 2,740,522; 2,729,557; 2,831,841; and 2,909,508. Said copolymers will be used in the hydrolyzed form, as discussed above for the homopolymers.

Crosslinked polyacrylamides and crosslinked polymethacrylamides, partially hydrolyzed as described above, can also be used in the practice of the invention. In general, said crosslinked polyacrylamides can be prepared by the methods described above, but including in the monomeric mixture a suitable amount of a suitable crosslinking agent. Examples of crosslinking agents include methylenebisacrylamide, divinylbenzene, vinyl ether, divinyl ether, and the like. Said crosslinking agents can be used in small amounts, e.g., up to about 1 percent by weight of the monomeric mixture. Such crosslinking is to be distinguished from any crosslinking which occurs when solutions of polymers are gelled as described herein.

Mixtures of the above-described polymers can also be used in the practice of the invention. All the polymers useful in the practice of the invention are characterized by high molecular weight. The molecular weight is not critical so long as the polymer has the above-described water-dispersible properties. It is preferred that the polymer have a molecular weight of at least 100,000. The upper limit of molecular weight is unimportant so long as the polymer is water-dispersible, and the aqueous gel prepared therefrom can be pumped. Thus, polymers having molecular weights as high as 20,000,000 or higher, and meeting said conditions, can be used.

The amount of said polymers used in the practice of the invention can vary widely depending upon the particular polymer used, the purity of said polymer, and properties desired in said aqueous gels. In general, the amount of polymer used will be a water-thickening amount, i.e., at least an amount which will significantly thicken the water or brine to which it is added. For example, amounts in the order of 25 to 100 parts per million weight (0.0025 to 0.01 weight percent) have been found to significantly thicken water. For example, distilled water containing 25 ppm of a polyacrylamide having a molecular weight of about $10 \times 10^6$ has a viscosity increase of about 41 percent. At 50 ppm the viscosity increase is about 106 percent. At 100 ppm the viscosity increase is about 347 percent. As another example, distilled water containing 25 ppm of a polyacrylamide having a molecular weight of about $3.5 \times 10^6$ has a viscosity increase of about 23 percent. At 50 ppm the viscosity increase is about 82 percent. At 100 ppm the viscosity increase is about 241 percent. Generally speaking, amounts in the range of from 0.0025 to 5, preferably from 0.01 to 1.5, more preferably 0.025 to 0.4, weight percent, based on the weight of water or brine, can be used. However, amounts outside said ranges can be used. In general, with the proper amounts of polyvalent metal and reducing agent, the amount of polymer used will determine the consistency of the gel obtained. Small amounts of polymer will usually produce liquid mobile gels which can be readily pumped whereas large amounts of polymer will usually produce thick, viscous, somewhat elastic gels. If desired, said thick gels can be "thinned" by dilution with water or brine to any desired concentration of polymer. This can be done by mechanical means, e.g., stirring, pumping, or by means of a suitable turbulence inducing device to cause shearing, such as a jet nozzle. Thus, there is really no fixed upper limit on the amount of polymer which can be used.

However, we have discovered that when a liquid mobile gel is desired, it is definitely preferred to first prepare a concentrated gel and dilute the more concentrated gels before they become too viscous. In general, dilute gels are more difficult to prepare in that, for one thing, gelling times are longer. More importantly for some reason not yet completely understood, the gels are usually more effective in their intended uses when a concentrated gel is first prepared and then diluted to the desired concentration. Another advantage is that, in general, less gelling agents are required for a given viscosity.

Metal compounds which can be used in the practice of the invention are water-soluble compounds of polyvalent metals wherein the metal is present in a valence state which is capable of being reduced to a lower polyvalent valence state. Examples of such compounds include potassium permanganate, sodium permanganate, ammonium chromate, ammonium dichromate, the alkali metal chromates, the alkali metal dichromates, and chromium trioxide. Sodium dichromate and potassium dichromate, because of low cost and ready availability, are the presently preferred metal-containing compounds for use in the practice of the invention. The hexavalent chromium in said chromium compounds is reduced in situ to trivalent chromium by suitable reducing agents, as discussed hereinafter. In the permanganate compounds the manganese is reduced from +7 valence to +4 valence as in $MnO_2$.

The amount of said metal-containing compounds used in the practice of the invention will be sensible amount, i.e., a small but finite amount which is more than incidental impurities, but which is effective or sufficient to cause subsequent gellation when the metal in the polyvalent metal compound is reduced to a lower polyvalent valence state. The lower limit of the concentration of the starting metal-containing compound will depend upon several factors including the particular type of polymer used, the concentration of the polymer in the water or brine to be gelled, the water or brine which is used, and the type of gel product desired. For similar reasons, the upper limit on the concentration of the starting metal-containing compound also cannot always be precisely defined. However, it should be noted that excessive amounts of the starting metal compound, for example +6 chromium, which can lead to excessive amounts of +3 chromium when there is sufficient reducing agent present to reduce the excess +6 chromium, can adversely affect the stability of the gels produced. As a general guide, the amount of the starting polyvalent metal-containing compound used in preparing aqueous gels in accordance with the invention will be in the range of from 0.05 to 60, preferably 0.5 to 30, weight percent of the amount of the polymer used. Stated another way, the amount of the starting polyvalent metal-containing compound used will usually be an amount sufficient to provide at least about $3 \times 10^{-6}$, preferably at least $3 \times 10^{-5}$, gram atoms of said metal capable of being reduced per gram of polymer. Preferably, the amount of said metal capable of being reduced which is used will not exceed $4 \times 10^{-3}$, more preferably $2 \times 10^{-3}$, gram atoms of said metal per gram of polymer. However, in some situations it may be desirable to use amounts of the starting polyvalent metal-containing compound which are outside the above ranges. Such use is within the scope of the invention. Those skilled in the art can determine the amount of starting polyvalent metal-containing compound to be used by simple experiments carried out in the light of this disclosure. For example, when brines, such as are commonly available in producing oil fields, are used in accordance with the invention as the water in preparing gels, less of the starting polyvalent metal-containing compound is required than when distilled water is used. Stable gels have been prepared using brines having a wide range of dissolved solids content, e.g., greater than 60,000 ppm, and higher, total dissolved solids, depending upon the particular polymer used having a degree of hydrolysis as defined above, and the brine used. Gellation rates are frequently faster when using said brines. Such oil field brines commonly contain varying amounts of sodium chloride, calcium chloride, magnesium chloride, etc. Sodium chloride is usually present in the greatest concentration.

When using polyacrylamides and related polymers having not more than about 14 percent of the carboxamide groups hydrolyzed to carboxyl groups, in accordance with the present invention, water having a total dissolved solids content greater than 60,000 ppm by weight is a preferred medium for preparing the gels described herein. Good results have been obtained when using brines having a total dissolved solids content much greater than about 60,000 ppm by weight, e.g., up to at least about 174,000 ppm by weight. Furthermore, of said total dissolved solids, the amount of polyvalent metal ions such as calcium, magnesium, etc., can be greater than 6,000 ppm by weight. Good results have been obtained when using brines having greater than 12,000 ppm by weight of said polyvalent metal ions. As shown by the examples given hereinafter, the above results are in marked contrast to the results obtained when the polymers used have 15 percent or more of the carboxamide groups hydrolyzed to carboxyl groups.

Another advantage in using strong field produced brines in preparing aqueous gels as described herein, in addition to the economic advantage of using readily available materials, is that the problem of disposing of such brines is lessened.

Suitable reducing agents which can be used in the practice of the invention include sulfur-containing compounds such as sodium sulfite, sodium hydrosulfite, sodium metabisulfite, potassium sulfite, sodium bisulfite, potassium metabisulfite, sodium sulfide, sodium thiosulfate, ferrous sulfate, thioacetamide, hydrogen sulfide, and others; and nonsulfur-containing compounds such as hydroquinone, ferrous chloride, p-hydrazinobenzoic acid, hydrazine phosphite, hydrazine dichloride, and others. Some of the above reducing agents act more quickly than others, for example, sodium thiosulfate usually reacts slowly in the absence of heat, e.g., heating to about 125°–130° F. The presently most preferred reducing agents are sodium hydrosulfite or potassium hydrosulfite.

The amount of reducing agent to be used in the practice of the invention will be a sensible amount, i.e., a small but finite amount which is more than incidental impurities, but which is effective or sufficient to reduce at least a portion of the higher valence metal in the starting polyvalent metal-containing compound to a lower polyvalent valance state. Thus, the amount of reducing agent to be used depends, to some extent at least, upon the amount of the starting polyvalent metal-containing compound which is used. In many instances, it will be preferred to use an excess of reducing agent to compensate for dissolved oxygen in the water or brine, exposure to air during preparation of the gels, and possible contact with other oxidizing substances such as might be encountered in field operations. As a general guide, the amount of reducing agent used will generally be within the range of from 0.1 to at least 150, preferably at least about 200, weight percent of the stoichiometric amount required to reduce the metal in the starting polyvalent to said lower polyvalent valence state, e.g., +6 Cr to +3 Cr. However, in some instances, it may be desirable to use amounts of reducing agent outside said ranges. The use of such amounts is within the scope of the invention. Those skilled in the art can determine the amount of reducing agent to be used by simple experiments carried out in the light of this disclosure.

Various methods can be used for preparing the aqueous gels used in the practice of the invention. Either the metal-containing compound or the reducing agent can be first added to a solution or dispersion of the polymer in water or brine, or said metal-containing compound and said reducing agent can be added simultaneously to the solution or aqueous medium containing the polymer. Generally speaking, where convenient, the preferred method is to first disperse the polymer in the water or other aqueous medium such as brine. The reducing agent is then added to the dispersion of polymer, with stirring. The metal-containing compound is then added to the solution or aqueous medium containing the polymer and the reducing agent, with stirring. Gellation starts as soon as reduction of some of the higher valence metal in the starting polyvalent metal-containing compound to a lower valence state occurs. The newly-formed lower valence metal ions, for example +3 chromium obtained from +6 chromium, effect rapid crosslinking of the polymer and gellation of the solution or aqueous medium containing same.

In another method, the aqueous gels can be formed in situ in the formation to be treated. This method is useful when the reducing agent is a reducing gas such as hydrogen sulfide or a hydrogen sulfide containing gas. The reducing gas can be naturally occurring in the formation or can be introduced into the formation. Thus, the polymer can be dispersed in water and the metal-containing compound added to the resulting dispersion. Said dispersion is then pumped into contact with said formation. Upon contacting the reducing gas, either naturally occurring or injected following the injection of said dispersion, the metal in the metal-containing compound will be reduced, e.g., $Cr^{+6}$ to $Cr^{+3}$, and gellation will be effected. If desired, the gel can then be moved through said formation by the subsequent injection of a drive fluid, e.g., water.

It is also within the scope of the invention to prepare a dry mixture of the polymer, the metal-containing compound and the reducing agent, in proper proportions, and then add this dry mixture to the proper amount of water or brine.

An advantage of the invention is that ordinary ambient temperatures and other conditions can be used in practically all instances in preparing the aqueous gels used in the practice of the invention or aqueous mediums containing same. However, in some instances, a small amount of heat may be desirable to aid in the formation of the gel, e.g., heating to a temperature of about 125°–130° F.

Aqueous gels used in the practice of the invention can be prepared having a wide range of viscosities or firmness ranging from low viscosity or highly mobile gels having a relatively low viscosity up to thick, viscous, somewhat elastic gels which are relatively nonmobile. The choice of gel viscosity or concentration will depend upon the use to be made of the gel. For example, when the gel is to be used in a fluid drive operation for the secondary recovery of oil, or otherwise injected into the pores of a non-fractured porous media, the gel viscosity or concentration can have any value which will permit the gel to be injected into said pores for the intended purpose. The actual viscosity and/or gel strength of the gel will depend upon the type and concentration of the polymer, the type and amount of starting polyvalent metal compound used, and the type and amount of reducing agent used.

One presently preferred procedure is to prepare a relatively concentrated or high viscosity gel and dilute same to a viscosity or concentration suited for the actual use of the gel. In many instances, this procedure results in a more stable gel, in addition to the advantages mentioned above.

When employing said dilution technique a starting solution or dispersion of polymer containing, for example, 1,000 to 10,000 ppm (0.1 to 1 wt. percent) or more of polymer can be used. This solution or dispersion is then gelled by the addition of suitable amounts of polyvalent metal compound and reducing agent. After gellation has proceeded to the desired extent, the resulting gel can be diluted with water to the concentration or viscosity most suited for its intended use. For example, if the gel is to be used in a waterflood operation, it could be diluted to a nominal 4,000, 2,500, 1,000, 500, 250, or less, ppm gel by the addition of a suitable amount of water. The more concentrated polymer solutions or dispersions usually have a faster rate of gellation. Thus, in most instances, it will be preferred to carry out the dilution soon after the components of the gel have been added to the water or brine, e.g., within about 5 to 30 minutes. Preferably, the concentration of the polymer in the "concentrated gel" will be at least twice that in the final gel. Dilution of the gel retards the rate of gellation. Thus, this dilution technique can be employed to control the gellation rate, if desired. In many instances, gels prepared by employing said dilution technique are more stable. Another advantage of said dilution technique is that it is usually more convenient to weigh out and handle the larger quantities of reagents.

We are aware that chromium ions having a valence of +3 have been used to react with water-dispersible polymers such as polyacrylamides and polysaccharides. See, for example, U. S. Pat. No. 3,114,651 to Gentile and U. S. Pat. No. 3,383,307 to Goetz. In such processes the chromium compound is added in a form wherein the chromium has an initial valence of +3, e.g., $CrCl_3$, $Cr(NO_3)_3$, etc. In the practice of the present invention, the $Cr^{+3}$ ions must be newly formed, e.g., nascent ions formed in situ in the solution to be gelled by the reduction of $Cr^{+6}$ ions to $Cr^{+3}$ ions. We have found that aqueous gels of polymer solutions prepared using such newly formed $Cr^{+3}$ ions have much better long term stability than do gels prepared by the direct addition of $Cr^{+3}$ ions.

Gel instability is evidenced by precipitation and/or syneresis (bleeding or water separation). A severe test of gel stability is to prepare the gel and merely allow it to stand. We have found that gels which are stable for as long as 48 hours are usually stable for a month or longer. We have also found that formation solids such as sandstone and limestone improve gel stability.

Generally speaking, the pH of the final solution of the gelling reagents is preferably less than 7, more preferably in the order of 6. In general, pH is not controlling, but higher pH values retard gellation rate. In general, the pH of the gelling solution will depend upon the reducing agent used. If desired, the pH can be adjusted by the addition of a suitable acid, depending upon the reducing agent used.

Herein and in the claims, unless otherwise specified, the aqueous gels used in the practice of the invention are defined for convenience, and not by way of limitation, in terms of the amount of polymer contained therein, irrespective of whether or not all the polymer has entered into the gel-forming reaction. For example, a 1 weight percent or 10,000 ppm gel is a gel which was prepared from a starting polymer solution or dispersion which contained 1 weight percent or 10,000 ppm by weight of polymer. The same system is employed for the gels prepared by the above-described dilution technique.

As indicated above, the above-described aqueous gels are particularly useful in fluid drive operations for the secondary recovery of oil. Said gels are applicable for decreasing the mobility of a drive fluid, such as water or other fluids, or decreasing the permeability of nonfractured porous formations prior to or during secondary recovery operations, such as fluid drive processes, and also for water shutoff treatments in producing wells. In such processes the aqueous gels can be injected into the formation prior to or subsequent to another injected fluid. For example, in one particular useful application, a slug of aqueous gel can be injected after a previously injected slug of a fluid such as a detergent and/or oil-containing fluid which serves to loosen the oil from the formation. Said slug of gel can then be followed by water to push both of said slugs toward the production well. In one embodiment of the invention, a conventional waterflood or gas drive is carried out in conventional manner until the drive fluid breaks through into the production well in excessive amounts. An above-described gel is then pumped down the well and into the nonfractured porous formation in any suitable manner, any suitable amount, and for any desired period of time sufficient to obtain the desired in-depth penetration and decrease in mobility of the drive fluid, or decrease in permeability of the high permeability zones of said formation. Usually, an in-depth penetration of from 10 to 1,000, preferably 75 to 900, feet from the injection well will be sufficient. However, this can vary from formation to formation and penetrations outside said ranges can be used. For example, there can be injected into the formation via the injection well from about 0.001 to about 0.5 pore volume of a gel in accordance with the invention over a suitable period of time ranging from one day to 6 months. Or, the injection of the gel can be carried out by injecting a slug of about 200 to 5,000 barrels of gel into the well and then into the formation. Injection in one of the above manners will provide a flood front adjacent the oil to be produced. If desired, an ordinary brine or water can then be employed to drive this slug or band or front of gel on through the formation to the production well. If desired, in order to avoid any sharp demarcations in viscosity or mobility of the gel, which could adversely affect the relative mobility of the flood medium and the oil, and cause channeling, the viscosity or concentration of the gel can gradually be lessened through a series of incremental decreases rather than discontinuing the injection thereof abruptly. Also, if desired, said slug of brine or water can be followed with another slug of gel.

In another embodiment of the invention, the nonfractured porous formation can be treated prior to carrying out the fluid drive secondary recovery operations. This embodiment is particularly applicable where there is a good knowledge of the nature of the formation. Thus, in such a formation where the oil-bearing strata are interspersed with more permeable porous strata which contain no oil, or an insufficient amount of oil to make secondary recovery operations economical, but which more permeable strata would still act as a thief zone, the formation can be treated in accordance with the invention prior to initiating the fluid drive operation.

In still another embodiment, the invention can be applied to producing wells, either oil wells or gas wells, where there is a more porous nonhydrocarbon-bearing strata adjacent the hydrocarbon-bearing strata. For example, such a condition can exist where there is a water sand adjacent the hydrocarbon-bearing sand and the water intrudes into the borehole and interferes with the production of hydrocarbon. In such instances, the formation can be treated in accordance with the invention to shut off the flow of water. The method of carrying out such a water shutoff treatment is substantially the same as described above in connection with fluid drive operations.

In any of the above-described embodiments of the invention, a slug of ungelled polymer can be injected ahead of the aqueous gel. The ungelled polymer can thus be used to satisfy the absorption requirements of the formation, resulting in less absorption and more efficient utilization of the aqueous gel. The initial injection of ungelled polymer also aids in reducing face plugging where this is a problem.

It is also within the scope of the invention to carry out the gel injection techniques of the invention periodically or intermittently, as needed, during the course of a fluid drive secondary operation, or during the production of oil from a producing well.

In all of the above operations, the injection of the gel can be carried out in conventional manner. If desired, a gel of suitable viscosity or concentration can be injected as the drive fluid per se. Gels injected in accordance with the invention can be prepared in advance, stored in suitable tanks, and then pumped into the well. Or, said gels can be formed in a conduit leading to the injection well, or in the tubing in the well itself, and then injected into the formation. Thus, the required amounts of polymer, polyvalent metal compound, and reducing agent can be metered into the tubing in the well, mixed therein, and then injected into the formation. If desired, selected portions of the formation can be isolated mechanically, as by the use of packers, and other means known to the art, for treatment in accordance with the invention.

The above-described aqueous gels can comprise, or can be employed as, drilling fluids in the drilling of wells in any manner known to the art for the use of drilling fluids. Such gels can be employed without the addition of other materials thereto. However, if desired, weighting agents such as barium carbonate, barium sulfate, amorphous silica, etc., can be included in the drilling fluids comprising said aqueous gels. If desired, other additives compatible with the aqueous gels can also be included in the drilling fluid. Thus, the drilling fluids can include clays such as bentonite, attapulgus clay, fluid loss agents, etc. It should be understood that not all of these additives or constituents will necessarily be present in any one drilling fluid and that the amount of any particular additive used will be governed by the other constituents present under the particular well conditions existing. As indicated, in selecting such additives for use in a particular drilling fluid, care should be taken to avoid materials which are not compatible with the aqueous gels. The use of such additives will be governed in part by the viscosity and fluid loss properties desired in the drilling fluid. Thus, as is the situation in connection with conventional drilling fluids, pilot tests should be run to determine the properties desired for the aqueous gel used as the drilling fluid, or an aqueous gel containing one of the above-described additives, to determine the optimum results or properties desired for the drilling fluid under the particular weld conditions existing.

The following examples will serve to further illustrate the invention.

EXAMPLE I

A series of aqueous gels was prepared using various commercially available polyacrylamides having different molecular weights and different amounts of the carboxamide groups therein hydrolyzed to carboxylic groups. Said gels were prepared using a typical sample of brine produced in the East Hull Silk Field in Archer County, Texas. This brine analyzed as follows:

|  | ppm by weight |
|---|---|
| NaCl | 124,000 |
| $CaCl_2$ | 34,200 |
| $MgCl_2 \cdot 2H_2O$ | 16,000 |
| Total: | 174,200 |

Each of the aqueous gels tested contained 2,000 ppm by weight of polymer and was prepared as follows. Two grams of each polymer were added to 1 liter of said brine. To each of the resulting solutions there was added, with stirring, an amount of a 10 weight percent solution of sodium hydrosulfite sufficient to provide 300 ppm by weight of $Na_2S_2O_4$. There was then added, with stirring, an amount of a 10 weight percent solution of sodium dichromate sufficient to provide 300 ppm of $Na_2Cr_2O_7 \cdot 2H_2O$. Properties of each of the resulting gels, or solutions, are set forth in Table I below.

TABLE I

| Polymer | Molecular Weight | Percent Hydrolyzed | Polymer Solution Viscosity[1] cp. | Viscosity[2] at 72 hr. cp. | Remarks |
|---|---|---|---|---|---|
| PF 1160 | $15 \times 10^6$ | 3.6 | 5.4 | >100,000 | clear solution without precipitate; excellent gel |
| PF 1110 | $8 \times 10^6$ | 11 | 11.5 | >100,000 | clear solution; gel not as smooth as PF 1160 gel |
| WC 500 | $3.5 \times 10^6$ | 15 | 4.4 | 2.4 | clear solution, but did not form gel |
| DP 1000 | $10 \times 10^6$ | 21 | 5.9 | 2.3 | solution precipitated; gelled, but gel broke in 24 hrs. |
| PF 1120 | $16 \times 10^6$ | 25 | 6.3 | 2.1 | solution turbid; gelled, but gel broke in 24 hrs. |
| WC 773 | $16 \times 10^6$ | 35 | 3.3 | 2.5 | clear solution, but did not form gel |
| PF 1130 | $10.5 \times 10^6$ | 40 | 2.7 | — | solution baldy precipitated; did not form gel |

[1] Measured on Brookfield viscometer at 6 rpm, after solution hydrated 24 hours.
[2] Measured on Brookfield viscometer at 6 rpm.

Additional test runs were made on other polyacrylamide solutions, gelled and ungelled, containing 1,500, 3,000, and 10,000 ppm by weight of polyacrylamides having molecular weights and percent hydrolyzed values comparable to those set forth in Table I above. These runs were made using a synthetic brine containing approximately 86,000 ppm by weight total dissolved solids. The results obtained were essentially the same as set forth in Table I.

The above data show that polyacrylamides wherein 15 percent of the carboxamide gropus have been hydrolyzed to carboxylic groups cannot be used in preparing stable gels of polyacrylamide solutions in strong brines. Said data also show that polyacrylamides wherein 11 percent of the carboxamide groups have been hydrolyzed can be used in preparing stable gels. With brines containing less dissolved solids than the brine used in this Example I, e.g., at least about 40,000 ppm by weight, polymers having a degree of hydrolysis of more than 11 percent, e.g., up to about 14 percent, can be used in the practice of the invention.

EXAMPLE II

An aqueous gel was prepared from a solution which initially contained 1000 parts per million (0.1 weight percent) of a substantially linear polyacrylamide having a molecular weight of about $16 \times 10^6$ and a degree of hydrolysis of about 25 percent. Said gel was prepared as given below.

One gram of said polyacrylamide was added to 1 liter of synthetic East Hull Silk Brine to give an ungelled solution of polyacrylamide. Said synthetic brine was prepared by adding to distilled water the required amounts of sodium chloride, calcium chloride, and magnesium chloride necessary to approximate the concentration of cations found in a typical sample of actual field produced brine. Said synthetic brine had the following composition:

|  | ppm |
|---|---|
| $Na^+$ | 48,900 |
| $Ca^+$ | 12,300 |
| $Mg^{++}$ | 1,900 |
| $Cl^-$ | 104,000 |
| Total: | 167,100 |

To a portion of said ungelled solution of polyacrylamide there was added, with stirring, sufficient sodium hydrosulfite (10% solution in distilled water) to give 300 ppm by weight of $Na_2S_2O_4$. To the resulting solution there was then added, with mixing, sufficient sodium dichromate (10% solution in distilled water) to give 300 ppm by weight of $Na_2Cr_2O_7 \cdot 2H_2O$. The resulting gel was a nominal 1,000 ppm gel (0.1 weight percent).

Said 1,000 ppm gel and said solution of ungelled polyacrylamide were then used to carry out water diversion tests in a linear displacement model (sand pack) prepared as follows. A Lucite pipe 12 inches long having an internal diameter of 1.0625 inches was filled with Ottawa sand. The filled pipe (pack) was then evacuated to remove air. The evacuated pack was then flooded with $CO_2$ gas to further remove any air. The pack was then again evacuated. The pack was then flooded with water from the bottom so as to remove all traces of gas therefrom. The column was mounted in a horizontal position then flooded with an oil having a viscosity of 50 centipoises at 75° F. so as to establish an oil saturation and residual connate water saturation condition. The pack was then waterflooded with the above-described synthetic East Hull Silk brine for a sufficient period of time to give an exit water-to-oil ratio in excess of 100:1, and thus insure that all mobile oil had been removed therefrom. The pack was then considered to be in a flooded-out state with residual oil saturation.

The thus-prepared linear displacement model had a pore volume of 65 milliliters, a porosity of 36 percent, and a residual oil saturation (Sor) of 0.15. The pack was mounted in a horizontal position and provided with a pressure tap at 3 inches from the inlet end. Water diversion tests were then carried out as described below, with all liquids being pumped into said inlet end of the pack.

In making water diversion tests using the above-described pack, the various liquids are pumped into the pack at uniform rates simulating a linear velocity of about 70 feet per day. Pressure readings are taken at the inlet end and at the pressure tap located three inches from the inlet. The data thus obtained are employed to calculate mobility values using Darcy's linear flow equation. Said equation can be written as follows:

$$K/\mu = QL/A\Delta P$$

wherein the factor $K/\mu$ represents mobility in millidarcys divided by the viscosity of the liquid, $Q$ represents flow rate in cubic centimeters per second, $L$ represents the length of the pack in centimeters, $A$ represents cross-sectional area of the pack in square centimeters, and $\Delta P$ represents the differential pressure in atmospheres. Since $L$ and $A$ are constant for any given model, mobility can be readily calculated from $Q/\Delta P$. If desired, in employing the data, mobility values can be plotted as the ordinate versus cumulative volume injected as the abscissa.

The test was carried out by first introducing 50 ml of oil having a viscosity of 50 cp at 75° F. to establish the mobility of the pack to oil. Mobility measurements were then carried out by first introducing a total of 750 milliliters of said brine at a uniform rate such that the linear velocity through the pack was about 70 feet per day. After 500 milliliters of said brine had passed through the pack, it was determined that the water-to-oil ratio in the pack effluent was greater than 100:1, showing that all the mobile oil had been removed from the pack. Next, a total of 250 milliliters of the above-described ungelled solution of polyacrylamide containing 1,000 ppm (0.1 weight percent) of polymer was introduced at the same rate. This was followed by the injection of another 250 milliliters of said brine at the same rate. Next, 120 milliliters of the above-described gelled solution of polyacrylamide containing 1,000 ppm (0.1 weight percent) of polymer was introduced at the same rate. The pack was shut in for two days to allow the gel to set. This was followed by 65 milliliters of said brine (1 pore volume) at the same rate to remove any displaceable gel. This was followed with 1713 milliliters of the 50 cp oil at the same rate to determine the effect the gelled solution had on the pack's mobility to oil. This was followed by 1876 milliliters of said brine at the same rate to determine the residual mobility change effected by the gel. Throughout the introduction of said liquids, pressure readings were taken at the entrance to the pack, and a point 3 inches from the entrance. Mobility values, $K/\mu$, for each liquid were calculated from said injection rate and the pressure readings, as described above. Results for the second section of the pack, i.e., between the pressure tap and the outlet of the pack, are set forth in Table II below.

TABLE II

| Liquid Injected | Cumulative Slug Volume of Liquid Injected, ml. | Total Cumulative Vol. of Liquid Inejcted, ml. | Mobility (K/82) md/cp | RRF |
|---|---|---|---|---|
| Oil | 60 | 60 | 350 | |
| " | 120 | 120 | 350 | |
| " | 150 | 150 | 350 | 1.0 |
| Brine | 610 | 760 | 7500 | |
| " | 687 | 837 | 7500 | |
| " | 750 | 900 | 7600 | 1.0 |
| Ungelled Solution of Polymer | 85 | 985 | 3700 | |
| " | 116 | 1016 | 3400 | |
| " | 250 | 1150 | 3400 | 2.2 |
| Brine | 130 | 1280 | 7500 | |
| " | 165 | 1315 | 7400 | |
| " | 250 | 1400 | 7500 | 1.0 |
| Gelled Solution of Polymer | 74 | 1474 | 4600 | |
| " | 90 | 1490 | 4700 | |
| " | 120 | 1520 | 4300 | 1.8 |
| Pack shut in two days after gel injection. Pack flushed with one pore volume of brine (65 ml.). | | | | |
| Oil | 138 | 1723 | 360 | |
| " | 632 | 2217 | 360 | |
| " | 882 | 2467 | 350 | |
| " | 1713 | 3298 | 340 | 1.0 |
| Brine | 496 | 3794 | 3500 | |
| " | 1147 | 4445 | 4000 | |
| " | 1636 | 4934 | 3900 | |
| " | 1876 | 5174 | 3800 | 2.0 |

Referring to Table II, the mobility of the oil in the pack initially was 350 millidarcys per centipoise. The mobility of the brine was 7,600 millidarcys, per cp. The mobility of the ungelled solution of polyacrylamide at the end of the injection thereof was 3,400 millidarcys per centipoise. The mobility of the second brine injection increment was 7,500, showing that the ungelled solution of polyacrylamide was eluted or washed out the pack, and that said ungelled solution was not effective in reducing the permeability of the column and/or decreasing the mobility of the brine. The mobility of the gelled solution of polyacrylamide was 4,300 millidarcys per centipoise. This indicated that the gelled solution of polyacrylamide was not superior to the ungelled solution of polyacrylamide for increasing resistance factors. The mobility of the final slug of oil injected stabilized at a value in the order of 350 millidarcys per centipoise, showing that both the gelled and the ungelled solutions of polyacrylamide had not materially affected the permeability of the pack to the oil. The mobility of the final slug of brine was in the order of 3,800 md per cp, indicating a residual resistance factor of 2 to the brine. From the above data, it is evident that the gelled solution of polyacrylamide used in this example did not significantly reduce the mobility of the brine in the sand pack. Thus, one would conclude that this gelled solution of polyacrylamide would not be effective in reducing the permeability of the more porous sections of a formation and thus divert flood water to the less porous sections of a formation.

EXAMPLE III

An aqueous gel was prepared from a solution which initially contained 1,000 parts per million (0.1 weight percent) of a substantially linear polyacrylamide having a molecular weight of about $15 \times 10^6$ and a degree of hydrolysis of about 3.6 percent. Said gel was prepared as follows. One gram of said polyacrylamide was added to 1 liter of the above-described synthetic East Hull Silk brine. To a portion of this ungelled solution there was then added, with mixing, sufficient sodium hydrosulfite (in 10% solution) to give 0.3 gram per liter of $Na_2S_2O_4$. To the resulting solution there was then added, with mixing, sufficient sodium dichromate (in 10% solution) to give 0.3 gram per liter of $Na_2Cr_2O_7 \cdot 2H_2O$. The resulting gel was a nominal 1,000 ppm gel (0.1 weight percent).

Said 1,000 ppm gel and said solution of ungelled polyacrylamide were then used to carry out water diversion tests in a linear displacement model (sand pack) prepared essentially as described above in Example II. The linear displacement model used had a pore volume of 65 milliliters, a porosity of 36 percent, and a residual oil saturation (Sor) of 0.15.

Mobility measurements were carried out by first introducing a total of 100 ml of oil having a viscosity of 50 cp at 75° F. to establish mobility of the pack to oil. There was then introduced a total of 1,460 milliliters of said synthetic brine at a rate such that the velocity through the column was about 70 feet per day. After 1,000 milliliters of said brine had passed through the pack, it was determined that the water-to-oil ratio in the pack effluent was greater than 100:1, showing that essentially all the mobile oil had been removed from the pack. Next, a total of 314 milliliters of said ungelled solution of polyacrylamide was introduced at the same rate. This was followed by 386 milliliters of said brine at the same rate. Next, 135 ml of said gelled solution of polyacrylamide were injected at the same rate. The pack was shut in for two days to permit the gel to set. This was followed by 84 ml of said brine (1.3 pore volume) to displace any movable gel. Next, 1,502 ml of said 50 cp oil was injected at the same rate to determine the pack mobility to oil after said gel injection. Next, 1,038 ml of said brine was injected to determine final resistance effects of the gel. Throughout the introduction of said liquids, pressure readings were taken at the entrance to the pack and a point 3 inches from the entrance to the pack. Mobility, $K/\mu$ of each liquid, was calculated from said injection rate and said pressure readings, as described above in Example II. The results for the second section of the pack, i.e., between the pressure tap and the outlet of the pack, are set forth in Table III below.

TABLE III

| Liquid Injected | Cumulative Slug Volume of Liquid Injected, ml. | Total Cumulative Vol. of Liquid Injected, ml. | Mobility (K/82) md/cp | RRF |
|---|---|---|---|---|
| Oil | 40 | 40 | 280 | |
| " | 60 | 60 | 280 | |
| " | 100 | 100 | 280 | 1.0 |
| Brine | 1130 | 1230 | 6000 | |
| " | 1395 | 1495 | 5600 | |
| " | 1460 | 1560 | 5700 | 1.0 |
| Ungelled Solution of Polymer | 114 | 1674 | 2400 | |
| " | 164 | 1724 | 2300 | |
| " | 314 | 1874 | 2400 | 2.4 |
| Brine | 251 | 2125 | 5400 | |
| " | 326 | 2200 | 5200 | |
| " | 386 | 2260 | 5300 | 1.1 |
| Gelled Solution of Polymer | 70 | 2330 | 2500 | |
| " | 90 | 2350 | 650 | |
| " | 120 | 2380 | 680 | |
| " | 135 | 2395 | 500 | 11.4 |
| Pack shut in two days after gel injection. Pack flushed with 1.3 pore volumes of brine (84 ml.). | | | | |
| Oil | 852 | 3331 | 48 | |

| | | | |
|---|---|---|---|
| " | 1042 | 3521 | 52 |
| " | 1252 | 3731 | 52 |
| " | 1502 | 3981 | 54 | 5.2
| Brine | 204 | 4185 | 18 |
| " | 376 | 4357 | 19 |
| " | 620 | 4601 | 19 |
| " | 1038 | 5019 | 18 | 317.0

The data in Table III shows that the initial mobility of the pack to oil was 280 md/cp, and the mobility of the pack to brine was 5,700 md/cp at residual oil saturation. During the injection of the ungelled solution of polyacrylamide, the mobility decreased to 2,400 md/cp. However, upon the subsequent injection of brine, the mobility increased to 5,300 md/cp, indicating that said ungelled solution was ineffective as a mobility control agent. Upon injection of the gelled solution of polyacrylamide, the mobility decreased to 500 md/cp. After allowing the gel to set two days, 1.3 pore volumes of brine were injected to remove any displaceable gel. Upon injection of oil to determine the mobility of the treated pack to oil, it was found that the mobility to oil had been reduced to about 50 md/cp, showing that the gelled solution of polyacrylamide had reduced the mobility of the pack to oil. The final brine injection gave a mobility of 18 md/cp, showing that the gelled solution of polyacrylamide was extremely effective in reducing the permeability of the pack to brine.

The above data show that the gelled solution of polyacrylamide gave a residual resistance factor (RRF) of 5.2 with respect to the oil, and an RRF of 317 with respect to the brine. This shows that the gelled solution of polyacrylamide was much more effective in reducing the permeability to brine than in reducing the permeability to oil.

The polyacrylamides used in Examples II and III had substantially the same properties with the exception that the polyacrylamide of Example II was about 25 percent hydrolyzed whereas the polyacrylamide of Example III was only about 3.6 percent hydrolyzed. Comparing the results of Examples II and III shows that the gelled solution of polyacrylamide in Example II was not effective in reducing the mobility of brine in the pack. In contrast, the gelled solution of polyacrylamide in Example III was very effective in reducing the mobility of the brine.

While certain embodiments of the invention have been described for illustrative purposes, the invention is not limited thereto. Various other modifications or embodiments of the invention will be apparent to those skilled in the art in view of this disclosure. Such modifications or embodiments are within the spirit and scope of the disclosure.

We claim:

1. In a method wherein a fluid medium is introduced into a borehole in the earth and into contact with a nonfractured porous subterranean formation penetrated by said borehole, the improvement wherein at least a portion of said fluid medium comprises an aqueous gel, and wherein said gel comprises water to which there has been added:
   a water-thickening amount of a water-dispersible polymer selected from the group consisting of: polyacrylamides and polymethacrylamides wherein from 0.1 to about 14 percent of the carboxamide groups are hydrolyzed to carboxyl groups; crosslinked polyacrylamides and crosslinked polymethacrylamides wherein from 0.1 to about 14 percent of the carboxamide groups are hydrolyzed to carboxyl groups; copolymers of acrylamide with another ethylenically unsaturated monomer copolymerizable therewith, sufficient acrylamide being present in the monomer mixture to impart said water-dispersible properties to the resulting copolymer when it is mixed with water, and wherein from 0.1 to about 14 percent of the carboxamide groups are hydrolyzed to carboxyl groups; and mixtures of said polymers;
   a sensible amount of a water-soluble compound of a polyvalent metal wherein the metal present is capable of being reduced to a lower polyvalent valence state and which is sufficient to gel said water when the valence of at least a portion of said metal is reduced to said lower valence state; and
   an amount of a water-soluble reducing agent which is effective to reduce at least a portion of said metal to said lower valence state; and
   wherein the initial total dissolved solids content of said water is greater than about 60,000 ppm by weight.

2. A method according to claim 1 wherein the amount of said water-soluble polyvalent metal compound is an amount sufficient to supply at least $3 \times 10^{-6}$ gram atoms of said metal capable of being reduced to said lower polyvalent valence state per gram of said polymer.

3. A method according to claim 1 wherein said aqueous gel comprises water to which there has been added:
   from 0.0025 to 5 weight percent of said polymer, based upon the weight of said water;
   from 0.05 to 60 weight percent of said polyvalent metal compound based upon the weight of said polymer; and
   from 0.1 to at least about 200 percent of the stoichiometric amount of said reducing agent required to reduce said polyvalent metal to said lower polyvalent valence state.

4. A method according to claim 3 wherein said polymer is a substantially linear polymer of acrylamide.

5. A method according to claim 4 wherein said compound of a polyvalent metal is a compound of chromium wherein the valence of the chromium is +6 and the valence of at least a portion of said chromium is reduced to +3.

6. A method according to claim 5 wherein said chromium compound is selected from the group consisting of ammonium chromate, ammonium dichromate, the alkali metal chromates and dichromates, chromium trioxide, and mixtures thereof.

7. A method according to claim 6 wherein said reducing agent is selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, hydrogen sulfide, ferrous chloride, p-hydrazinobenzoic acid, hydrazine phosphite, hydrazine dihydrochloride, and mixtures thereof.

8. A method according to claim 3 wherein:
   said polymer is a substantially linear polyacrylamide;
   said polyvalent metal compound is sodium dichromate; and
   said reducing agent is sodium hydrosulfite.

9. A method according to claim 1 wherein:
   said borehole comprises an injection well;
   said formation comprises an oil-bearing formation and is also penetrated by a production well;

said method is a fluid drive process carried out for the recovery of oil from said formation by injecting a drive fluid into the pores of said formation via said injection well and driving oil to said production well; and said fluid medium comprising said aqueous gel is introduced into said injection well and into the pores of said formation.

10. A method according to claim 9 wherein:
said fluid medium is injected into said formation prior to injecting a drive fluid into said formation via said injection well in said fluid drive process for driving said oil to said production well.

11. A method according to claim 10 wherein said aqueous gel comprises water to which there has been added:
from 0.025 to 0.4 weight percent of said polymer, based upon the weight of said water;
from 0.5 to 30 weight percent of said polyvalent metal compound based upon the weight of said polymer; and
from 0.5 to at least about 150 percent of the stoichiometric amount of said reducing agent required to reduce said polyvalent metal to said lower polyvalent valence state.

12. A method according to claim 11 wherein:
said polymer is a substantially linear polyacrylamide;
said polyvalent metal compound is sodium dichromate; and
said reducing agent is sodium hydrosulfite.

13. A method according to claim 9 wherein:
said fluid medium is injected into said formation subsequent to having injected a drive fluid into said formation via said injection well in said fluid drive process for driving said oil to said production well.

14. A method according to claim 13 wherein said aqueous gel comprises water to which there has been added:
from 0.025 to 0.4 weight percent of said polymer, based upon the weight of said water;
from 0.5 to 30 weight percent of said polyvalent metal compound based upon the weight of said polymer; and
from 0.5 to at least about 150 percent of the stoichiometric amount of said reducing agent required to reduce said polyvalent metal to said lower polyvalent valence state.

15. A method according to claim 14 wherein:
said polymer is a substantially linear polyacrylamide;
said polyvalent metal compound is sodium dichromate; and
said reducing agent is sodium hydrosulfite.

16. A method according to claim 26 wherein said compound of a polyvalent metal is a compound of chromium wherein the valence of the chromium is +6 and the valence of at least a portion of said chromium is reduced to +3.

17. A method according to claim 16 wherein said chromium compound is selected from the group consisting of ammonium chromate, ammonium dichromate, the alkali metal chromates and dichromates, chromium trioxide, and mixtures thereof.

18. A method according to claim 17 wherein said reducing agent is selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, hydrogen sulfide, ferrous chloride, p-hydrazinobenzoic acid, hydrazine phosphite, hydrazine dihydrochloride, and mixtures thereof.

19. A method according to claim 1 wherein:
said method comprises a method for drilling a said borehole into the earth;
a drill bit is actuated in said borehole in contact with said formation and penetrates same in the presence of said fluid medium; and
said fluid medium, together with formation solids entrained therein, is removed from said borehole.

20. A method according to claim 15 wherein said aqueous gel comprises water to which there has been added:
from 0.0025 to 5 weight percent of said polymer, based upon the weight of said water;
from 0.05 to 60 weight percent of said polyvalent metal compound based upon the weight of said polymer; and
from 0.1 to at least about 200 percent of the stoichiometric amount of said reducing agent required to reduce said polyvalent metal to said lower polyvalent valence state.

21. A method according to claim 20 wherein:
said polymer is a substantially linear polyacrylamide;
said polyvalent metal compound is sodium dichromate; and
said reducing agent is sodium hydrosulfite.

22. A method according to claim 19 wherein said aqueous gel comprises water to which there has been added:
from 0.01 to 1.5 weight percent of said polymer, based upon the weight of said water;
from 0.05 to 60 weight percent of said polyvalent metal compound based upon the weight of said polymer; and
from 0.1 to at least about 200 percent of the stoichiometric amount of said reducing agent required to reduce said polyvalent metal to said lower polyvalent valence state;
and wherein said polymer is a substantially linear polymer of acrylamide and from 0.1 to about 12 percent of the carboxamide groups in said polymer are hydrolyzed to carboxyl groups.

23. A method according to claim 22 wherein:
said polyvalent metal compound is a chromium compound wherein the valence of the chromium is +6 and the valence of at least a portion of said chromium is reduced to +3; and
said reducing agent is selected from the group consisting of hydroquinone, sodium sulfide, sodium hydrosulfite, sodium metabisulfite, potassium sulfite, sodium bisulfite, potassium metabisulfite, sodium sulfite, sodium thiosulfate, ferrous sulfate, hydrogen sulfide, ferrous chloride, p-hydrazinobenzoic acid, hydrazine phosphite, hydrazine dihydrochloride, and mixtures thereof.

24. A method according to claim 1 wherein:
said borehole comprises a producing well;
said method comprises a method for recovering hydrocarbons from said formation via said borehole, and for reducing the concomitant production of water from said formation; and
said fluid medium comprising said aqueous gel is introduced into said well and into the pores of said formation.

25. A method according to claim 1 wherein from 0.1 to about 12 percent of the carboxamide groups in said polymer are hydrolyzed to carboxyl groups.

26. A method according to claim 9 wherein said aqueous gel comprises water to which there has been added:
from 0.01 to 1.5 weight percent of said polymer, based upon the weight of said water;
from 0.05 to 60 weight percent of said polyvalent metal compound based upon the weight of said polymer; and
from 0.1 to at least about 200 percent of the stoichiometric amount of said reducing agent required to reduce said polyvalent metal to said lower polyvalent valence state;
and wherein said polymer is a substantially linear polymer of acrylamide and from 0.1 to about 12 percent of the carboxamide groups in said polymer are hydrolyzed to carboxyl groups.

* * * * *

UNITED STATES PATENT OFFICE
CERTIFICATE OF CORRECTION

Patent No. 3,749,172      Dated July 31, 1973

Inventor(s) James E. Hessert and Richard L. Clampitt

It is certified that error appears in the above-identified patent and that said Letters Patent are hereby corrected as shown below:

Col. 20, claim 20, line 20, delete "claim 15"

and insert --claim 19--.

Signed and sealed this 1st day of January 1974.

(SEAL)
Attest:

EDWARD M. FLETCHER, JR.       RENE D. TEGTMEYER
Attesting Officer      Acting Commissioner of Patents